Dec. 10, 1940. J. A. WIORA 2,224,561
BATTERY CARRIER
Filed Nov. 23, 1938
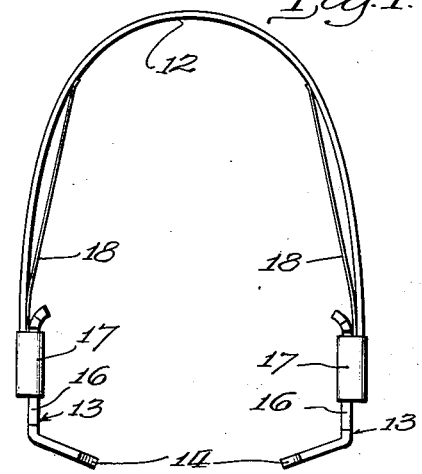
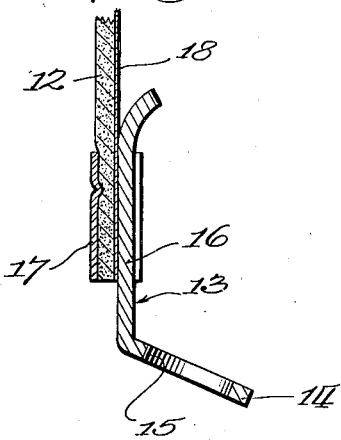
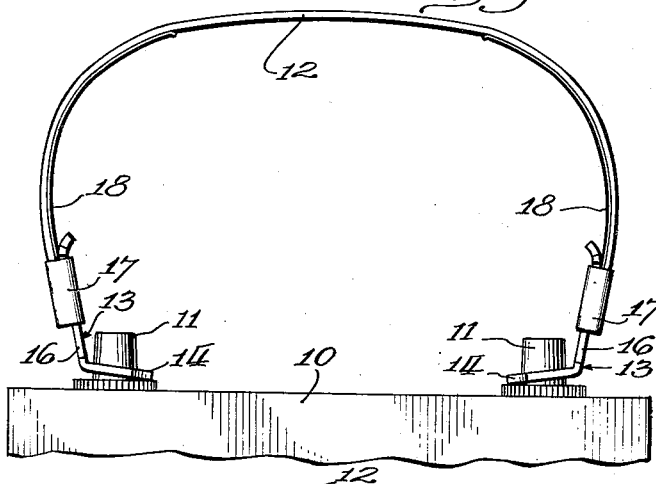
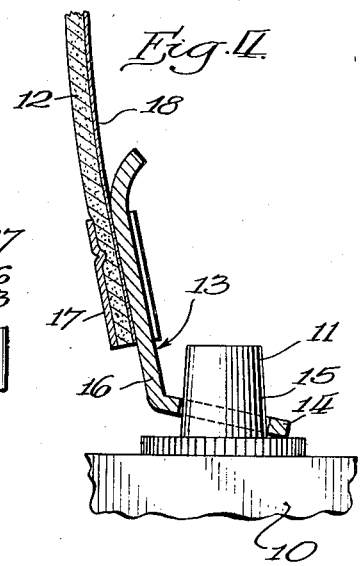
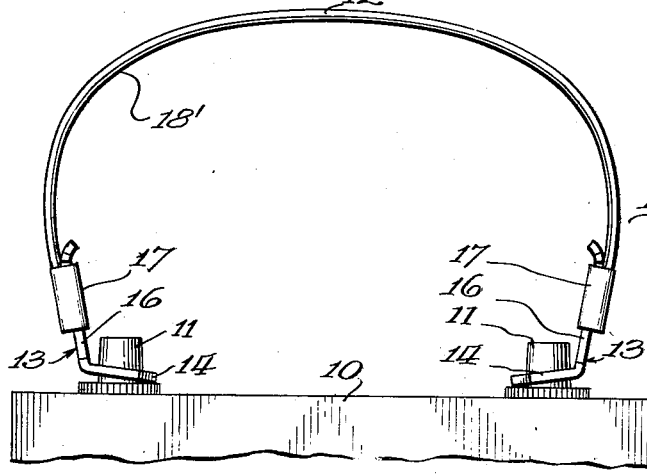
Inventor.
Joseph A. Wiora Patented Dec. 10, 1940

2,224,561

UNITED STATES PATENT OFFICE 2,224,561

BATTERY CARRIER

Joseph A. Wiora, Chicago, Ill.

Application November 23, 1938, Serial No. 241,908

3 Claims. (Cl. 294—92)

This invention relates to battery carriers which include a handle portion and gripping means at the ends thereof adapted to engage the terminals of the posts of a battery. Such battery carriers usually include a flexible handle portion and gripping members in the form of rigid plates provided with openings adapted to receive the battery terminals. When the intermediate handle portion is raised, the gripping members are canted so that the opposite edges of the openings therein effectively grip the battery terminals. The effectiveness of this grip depends upon the substantial weight of the battery.

Battery carriers of this type necessitate a considerable degree of care during lifting in order to make sure that the gripping members engage the battery terminals at a suitable location. If the handle is elevated carelessly, one or other of the gripping members may not engage the associated battery terminal or it may engage the battery terminal very near its end, so that the danger of disengagement during transport is incurred.

According to the present invention I provide an improved carrier in which the gripping means may be applied to the battery terminals in a definite position, the gripping members being held in that position irrespective of whether or not the battery carrier is or is not being used to support the weight of a battery. Consequently, when my improved carrier is applied to a battery it may be grasped and moved instantly without any care on the part of the workman.

My improved carrier includes means which are associated with the gripping members and with the intermediate handle portion in such a way that the gripping means are canted automatically when they are applied to the terminals of the battery.

The invention will readily be understood from the following description of preferred embodiments thereof, taken in conjunction with the accompanying drawing, in which:

Figure 1 is an elevational view of a carrier embodying my invention;

Fig. 2 is a similar view showing the carrier applied to a battery;

Fig. 3 is a fragmentary view on a larger scale, showing the relation of the elements of a carrier when the same is not applied to a battery;

Fig. 4 is a view similar to Fig. 3 showing the relation of the elements when the carrier is applied to a battery, and Fig. 5 is a view similar to Fig. 2, showing a further embodiment of the invention.

Referring to the drawing, the reference numeral 10 designates a conventional storage battery which is provided with a pair of terminals or posts 11 which project upwardly from the upper surface of the battery. My improved carrier comprises a central handle portion 12 which may suitably be in the form of a stout strap. At each end of this strap are two similar gripping members 13 which are adapted to grip the terminal posts 11.

Each gripping member 13 comprises a plate 14 which is provided with an opening 15. The opening 15 is slightly larger in diameter than the usual post 11, so that when the plate 14 is canted into position as shown in Fig. 4, opposite edges of the opening 15 will dig into the post 11. It will be understood that when the battery is lifted by the strap 12, the plates 14 being in the position shown in Fig. 4, the gripping effect between opposite edges of the opening 15 and the plate 14 will be caused to grip the terminals 11 very effectively owing to the weight of the battery. The gripping member 13 which includes the plate 14 may be secured to the strap 12 in any suitable manner. For example, the member 13 may include a shank portion 16 which may be secured to the extreme portion of the strap by means of a clip 17.

The means whereby the plates 14 are canted will now be described. In the embodiment of the invention shown in Figs. 1 and 2, a pair of flat springs 18 are provided. Each spring 18 is secured to the gripping member 13 and to the adjacent end of the strap 12 by being located between the shank portion 16 and the extremity of the strap, which members are firmly enclosed by the clip member 17. It will be understood that this clip member is strongly compressed during the assembly of the carrier so that the gripping member 13, one end of the strap 12 and one end of the spring 18 are rigidly secured together.

Each spring 18 extends upwardly on the under side of the strap 12 for a limited distance. The relation of the strap 12 and the springs 18 is such that it is necessary to deform the springs, as shown in Fig. 2, to move the plates 14 onto the terminals 11. This deformation of the springs cants the plates 14 in the manner shown in Figs. 2 and 4 and, consequently, the carrier is properly secured to the battery and it may be grasped without undue care by a workman about to transport the battery.

In the embodiment of the invention shown in Fig. 5 a single continuous spring 18' is employed instead of the springs 18 of the previously described embodiment. In this embodiment the spring 18' is insulated from the gripping members 13 to prevent shorting of the battery. The operation of this device is precisely similar to that of said embodiment.

Although the invention has been disclosed in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. A battery carrier comprising a pair of gripping members having openings adapted to receive the terminals of a battery, which members are adapted to grip the terminals when canted from horizontal position, a flexible handle portion connected to said gripping members, and resilient means constructed and arranged to engage said handle portion to cause canting of said members into gripping relation with the battery terminals when said gripping members are applied thereto.

2. A battery carrier comprising a pair of gripping members having openings adapted to receive the terminals of a battery, which members are adapted to grip the terminals when canted from horizontal position, a flexible strap connecting said gripping members, and a pair of flat springs secured to said gripping members and extending along the under side of the strap adapted to cant the gripping members when the same are applied to the terminals of a battery.

3. A battery carrier comprising a pair of gripping members having openings adapted to receive the terminals of a battery, which members are adapted to grip the terminals when canted from horizontal position, a flexible member connecting said gripping members, and a flat spring cooperating with said flexible member and said gripping means whereby the latter are canted into gripping relation when applied to the terminals of a battery.

JOSEPH A. WIORA.